United States Patent
Mallick et al.

(10) Patent No.: US 10,970,535 B2
(45) Date of Patent: Apr. 6, 2021

(54) SYSTEM AND METHOD FOR EXTRACTING TABULAR DATA FROM ELECTRONIC DOCUMENT

(71) Applicant: Innoplexus AG, Eschborn (DE)

(72) Inventors: Shubhojit Mallick, New Delhi (IN); Kedar Bartake, Pune (IN); Omkar Kumbhar, Pune (IN)

(73) Assignee: Innoplexus AG, Eschborn (DE)

( * ) Notice: Subject to any disclaimer, the term of this patent is extended or adjusted under 35 U.S.C. 154(b) by 99 days.

(21) Appl. No.: 16/366,428

(22) Filed: Mar. 27, 2019

(65) Prior Publication Data

US 2020/0089946 A1   Mar. 19, 2020

(30) Foreign Application Priority Data

Jun. 11, 2018 (GB) .................................... 1809546

(51) Int. Cl.
*G06K 9/00* (2006.01)
*G06K 9/34* (2006.01)
*G06K 9/40* (2006.01)

(52) U.S. Cl.
CPC ..... *G06K 9/00469* (2013.01); *G06K 9/00449* (2013.01); *G06K 9/00463* (2013.01); *G06K 9/346* (2013.01); *G06K 9/40* (2013.01); *G06K 2209/01* (2013.01)

(58) Field of Classification Search
CPC ........... G06K 9/00469; G06K 9/00449; G06K 9/00463; G06K 9/4609; G06K 9/48; G06K 2209/01; G06T 7/0083; G06T 2207/10016; G11B 27/28
See application file for complete search history.

(56) References Cited

U.S. PATENT DOCUMENTS

| | | | | |
|---|---|---|---|---|
| 7,769,772 B2 * | 8/2010 | Weyl | .................. | G06K 9/00463 707/765 |
| 8,156,116 B2 * | 4/2012 | Graham | ............. | G06Q 30/0241 707/728 |
| 8,180,396 B2 * | 5/2012 | Athsani | ................. | G06F 16/487 455/557 |

(Continued)

*Primary Examiner* — Amir Alavi
(74) *Attorney, Agent, or Firm* — Ziegler IP Law Group, LLC

(57) ABSTRACT

Disclosed is system for extracting tabular data from electronic document, system having data processing arrangement comprising: tabular data detection module that is operable to: (i) receive electronic document; (ii) determine location of tabular data within electronic document; and (iii) extract image of tabular data from electronic document; and tabular data extraction module that receives extracted image of tabular data from tabular data detection module, wherein tabular data extraction module is operable to: (i) convert received image of tabular data into greyscale image; (ii) extract grid structure from greyscale image; (iii) remove grid structure from greyscale image; (iv) determine position for placement of horizontal and vertical lines in greyscale image; (v) generate horizontal and vertical lines on greyscale image; (vi) perform optical character recognition of text associated with tabular data from received image; and (vii) extract tabular data by combining information of grid structure with text, to generate tabular data.

18 Claims, 11 Drawing Sheets

(56) References Cited

U.S. PATENT DOCUMENTS

| | | | |
|---|---|---|---|
| 8,489,987 B2* | 7/2013 | Erol | G06K 9/228 |
| | | | 715/273 |
| 8,634,650 B2* | 1/2014 | Konishi | H04N 1/46 |
| | | | 382/195 |
| 8,667,539 B2* | 3/2014 | Hartson | H04N 5/44504 |
| | | | 725/51 |
| 9,613,256 B2* | 4/2017 | Ghasemi | G06T 7/13 |
| 9,672,358 B1* | 6/2017 | Long | G06F 21/565 |
| 10,467,464 B2* | 11/2019 | Chen | G06K 9/00442 |
| 10,740,123 B2* | 8/2020 | Vaindiner | G06F 8/38 |
| 2018/0165851 A1* | 6/2018 | Apte | G06T 1/00 |

* cited by examiner

| 2015 | Dietmar Ley | John Jenning | Arndt Bake | Hardy Mehl |
|---|---|---|---|---|
| Transfer | Chairman of the management board (CEO) since 1998 | Management Board Sales (CCO) since 2006 | Management Board Marketing (CMO) since 2011 | Management Board Finance (CFO) since 2014 |
| Fixed Remuneration | 270,529.50 | 273,003.93 | 187,138.13 | 220,162.50 |
| Additional benefits | 15,425.51 | 54,210.44 | 21,102.98 | 15,843.80 |
| Total | 285,955.01 | 327,214.37 | 208,241.11 | 236,006.30 |
| One-year variable remuneration | 0.00 | 0.00 | 0.00 | 0.00 |
| Multi-year variable remuneration | 154,049.05 | 148,056.60 | 107,839.32 | 49,496.00 |
| Payout bonus bank | 154,049.05 | 148,056.60 | 107,839.32 | 49,496.00 |
| Other | 0.00 | 0.00 | 0.00 | 0.00 |
| Total | 440,004.06 | 475,270.97 | 316,080.43 | 285,502.30 |
| Pension expenses | 1,742.48 | 8,114.55 | 0.00 | 1,500.00 |
| Total payout | 441,746.54 | 483,385.52 | 316,080.43 | 287,002.30 |

FIG. 2A

| 2015 | Dietmar Ley | John Jenning | Arndt Bake | Hardy Mehl |
|---|---|---|---|---|
| Transfer | Chairman of the management board (CEO) since 1998 | Management Board Sales (CCO) since 2006 | Management Board Marketing (CMO) since 2011 | Management Board Finance (CFO) since 2014 |
| Fixed Remuneration | 270,529.50 | 273,003.93 | 187,138.13 | 220,162.50 |
| Additional benefits | 15,425.51 | 54,210.44 | 21,102.98 | 15,843.80 |
| Total | 285,955.01 | 327,214.37 | 208,241.11 | 236,006.30 |
| One-year variable remuneration | 0.00 | 0.00 | 0.00 | 0.00 |
| Multi-year variable remuneration | 154,049.05 | 148,056.60 | 107,839.32 | 49,496.00 |
| Payout bonus bank | 154,049.05 | 148,056.60 | 107,839.32 | 49,496.00 |
| Other | 0.00 | 0.00 | 0.00 | 0.00 |
| Total | 440,004.06 | 475,270.97 | 316,080.43 | 285,502.30 |
| Pension expenses | 1,742.48 | 8,114.55 | 0.00 | 1,500.00 |
| Total payout | 441,746.54 | 483,385.52 | 316,080.43 | 287,002.30 |

FIG. 2B

| 2015 | Dietmar Ley | John Jenning | Arndt Bake | Hardy Mehl |
|---|---|---|---|---|
| | Chairman of the management board (CEO) | Management Board Sales (CCO) | Management Board Marketing (CMO) | Management Board Finance (CFO) |
| Transfer | since 1998 | since 2006 | since 2011 | since 2014 |
| Fixed Remuneration | 270,529.50 | 273,003.93 | 187,138.13 | 220,162.50 |
| Additional benefits | 15,425.51 | 54,210.44 | 21,102.98 | 15,843.80 |
| Total | 285,955.01 | 327,214.37 | 208,241.11 | 236,006.30 |
| One-year variable remuneration | 0.00 | 0.00 | 0.00 | 0.00 |
| Multi-year variable remuneration | 154,049.05 | 148,056.60 | 107,839.32 | 49,496.00 |
| Payout bonus bank | 154,049.05 | 148,056.60 | 107,839.32 | 49,496.00 |
| Other | 0.00 | 0.00 | 0.00 | 0.00 |
| Total | 440,004.06 | 475,270.97 | 316,080.43 | 285,502.30 |
| Pension expenses | 1,742.48 | 8,114.55 | 0.00 | 1,500.00 |
| Total payout | 441,746.54 | 483,385.52 | 316,080.43 | 287,002.30 |

FIG. 2F

| 2015 | Dietmar Ley | John Jenning | Arndt Bake | Hardy Mehl |
|---|---|---|---|---|
| | Chairman of the management board (CEO) | Management Board Sales (CCO) | Management Board Marketing (CMO) | Management Board Finance (CFO) |
| Transfer | since 1998 | since 2006 | since 2011 | since 2014 |
| Fixed Remuneration | 270,529.50 | 273,003.93 | 187,138.13 | 220,162.50 |
| Additional benefits | 15,425.51 | 54,210.44 | 21,102.98 | 15,843.80 |
| Total | 285,955.01 | 327,214.37 | 208,241.11 | 236,006.30 |
| One-year variable remuneration | 0.00 | 0.00 | 0.00 | 0.00 |
| Multi-year variable remuneration | 154,049.05 | 148,056.60 | 107,839.32 | 49,496.00 |
| Payout bonus bank | 154,049.05 | 148,056.60 | 107,839.32 | 49,496.00 |
| Other | 0.00 | 0.00 | 0.00 | 0.00 |
| Total | 440,004.06 | 475,270.97 | 316,080.43 | 285,502.30 |
| Pension expenses | 1,742.48 | 8,114.55 | 0.00 | 1,500.00 |
| Total payout | 441,746.54 | 483,385.52 | 316,080.43 | 287,002.30 |

FIG. 2H

SYSTEM AND METHOD FOR EXTRACTING TABULAR DATA FROM ELECTRONIC DOCUMENT

CROSS-REFERENCE TO RELATED APPLICATIONS

This application claims the benefit under 35 U.S.C. § 119(a) and 37 CFR § 1.55 to UK Patent Application No. GB1809546.3, filed on Jun. 11, 2018, the entire content of which is incorporated herein by reference.

TECHNICAL FIELD

The present disclosure relates generally to tabular data extraction; and more specifically, to systems for extracting tabular data from electronic documents. Furthermore, the present disclosure also relates to methods for extracting tabular data from electronic documents. Moreover, the present disclosure also relates to software products recorded on machine-readable non-transient data storage media and executable upon computing hardware to implement the aforementioned methods.

BACKGROUND

Nowadays, portable document format (PDF) has become an essential format for communication and transfer of documents containing data and information, among people involved with the use of the data and information. Generally, an analyst conducts analysis of documents pertaining to a field in which the analyst has proficiency and expertise. For example, a financial analyst conducts analysis of documents pertaining to finance. The documents used in analysis involve data and information in form of tables. For example, the data and information in form of tables can be annual reports, comparative analysis, timelines, and session agenda. The tables allow the analyst to easily visualize and compute the data and information.

Typically, the analyst performs the analysis on the document by extracting the data and information. The extraction of data and information involves detection of the data and information in the tables and retrieval of the data and information to a document of different file-formats (such as, a file generated by a word-processing file, a spreadsheet file and so forth). However, the extraction of data and information in the tables has several problems related to it. Firstly, the analyst faces problem with copy and paste of the tables of data and information, from document in PDF format to document of different file-format. For example, there can be loss of information during copy and paste. Secondly, the tables can also be lost during the process of extraction. As a result, the hierarchy that is initially maintained in the tables is lost during the extraction process. Thirdly, certain tables do not have definite vertical and horizontal lines for segregation of the data and information. Consequently, during the extraction of such tables, a pattern and a sequence of the data and information are lost. Therefore, the essence of the data and information in the tables is lost during their extraction.

Presently, several existing methods and tools are used for extraction of data and information in the tables. The existing methods and tools extract the data and information in tables, from PDF format to different file-formats. However, the existing methods and tools involve poor auto detection technology, as a result, the analyst has to manually select the tables containing the data and information which can be tiresome when the number of selections are large. Furthermore, the existing methods and tools perform the process of extraction one page at a time, as a result, extraction cannot be done one batch (group of tables on one or more than one pages) at a time. Also, the existing methods and tools are unable to extract data and information in multiple row lines or merged cells inside table. Additionally, the existing methods and tools have limitations on the number of pages and size of the document on which the process of extraction is performed. Furthermore, the existing methods and tools have limitations on the number of pages a single table can exist. Moreover, the extraction process using the existing methods and tools causes variation in the font of the data and information.

Therefore, in light of the foregoing discussion, there exists a need to overcome the aforementioned drawbacks associated with extraction of data and information in form of tables within a PDF document.

SUMMARY

The present disclosure seeks to provide a system for extracting tabular data from an electronic document. The present disclosure also seeks to provide a method for extracting tabular data from an electronic document. The present disclosure also seeks to provide a software product. The present disclosure seeks to provide a solution to the existing problems associated with extraction of tabular data from electronic documents (such as PDF documents). An aim of the present disclosure is to provide a solution that overcomes at least partially the problems encountered in prior art, and provide the system and method to conveniently, efficiently and reliably extract tabular data from electronic documents while maintaining a format and structure (or hierarchy) thereof.

In one aspect, an embodiment of the present disclosure provides a system for extracting tabular data from an electronic document, the system having a data processing arrangement comprising:

a tabular data detection module that is operable to:
(i) receive the electronic document;
(ii) determine a location of the tabular data within the electronic document; and
(iii) extract an image of the tabular data from the electronic document; and a tabular data extraction module that receives the extracted image of the tabular data from the tabular data detection module, wherein the tabular data extraction module is operable to:
(i) convert the received image of the tabular data into a greyscale image of the tabular data;
(ii) extract a grid structure of the tabular data from the greyscale image;
(iii) remove the grid structure of the tabular data from the greyscale image, by superimposing the extracted grid structure on to the greyscale image;
(iv) determine a position for placement of horizontal and vertical lines in the greyscale image without the grid structure;
(v) generate horizontal and vertical lines on the greyscale image without the grid structure, to obtain information of grid structure of the tabular data;
(vi) perform optical character recognition of the text associated with the tabular data from the received image, to obtain information of text associated with the tabular data; and (vii) extract the tabular data by combining the information of the grid structure of the tabular data with the text associated with the tabular data, to generate the tabular data.

In another aspect, an embodiment of the present disclosure provides a method for extracting tabular data from an electronic document, the method comprising:
(i) receiving the electronic document;
(ii) determining a location of the tabular data within the electronic document;
(iii) extracting an image of the tabular data from the electronic document;
(iv) converting the extracted image of the tabular data into a greyscale image of the tabular data;
(v) extracting a grid structure of the tabular data from the greyscale image;
(vi) removing the grid structure of the tabular data from the greyscale image, by superimposing the grid structure on to the greyscale image;
(vii) determining a position for placement of horizontal and vertical lines in the greyscale image without the grid structure;
(viii) generating horizontal lines and vertical lines on the greyscale image without the grid structure, to obtain information of grid structure of the tabular data;
(ix) performing optical character recognition of the text associated with the tabular data from the extracted image, to obtain information of text associated with the tabular data; and
(x) extracting the tabular data by combining the information of the grid structure of the tabular data with the text associated with the tabular data, to generate the tabular data.

In yet another aspect, an embodiment of the present disclosure provides a software product recorded on machine-readable non-transient data storage media, characterized in that the software product is executable upon computing hardware to implement the method for extracting tabular data from an electronic document.

Embodiments of the present disclosure substantially eliminate or at least partially address the aforementioned problems in the prior art, and enables automatic selection of tabular data from electronic document and extraction of tabular data existing in multiple pages having large size of electronic document.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale.

Wherever possible, like elements have been indicated by identical numbers.

Figure 1:
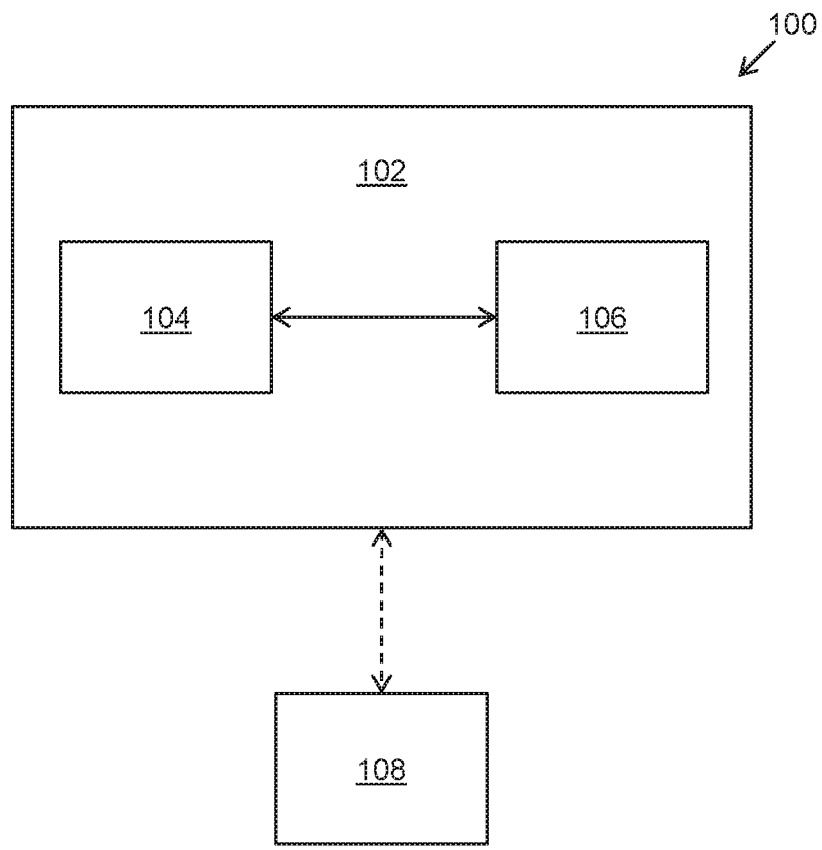
Figure 2C:
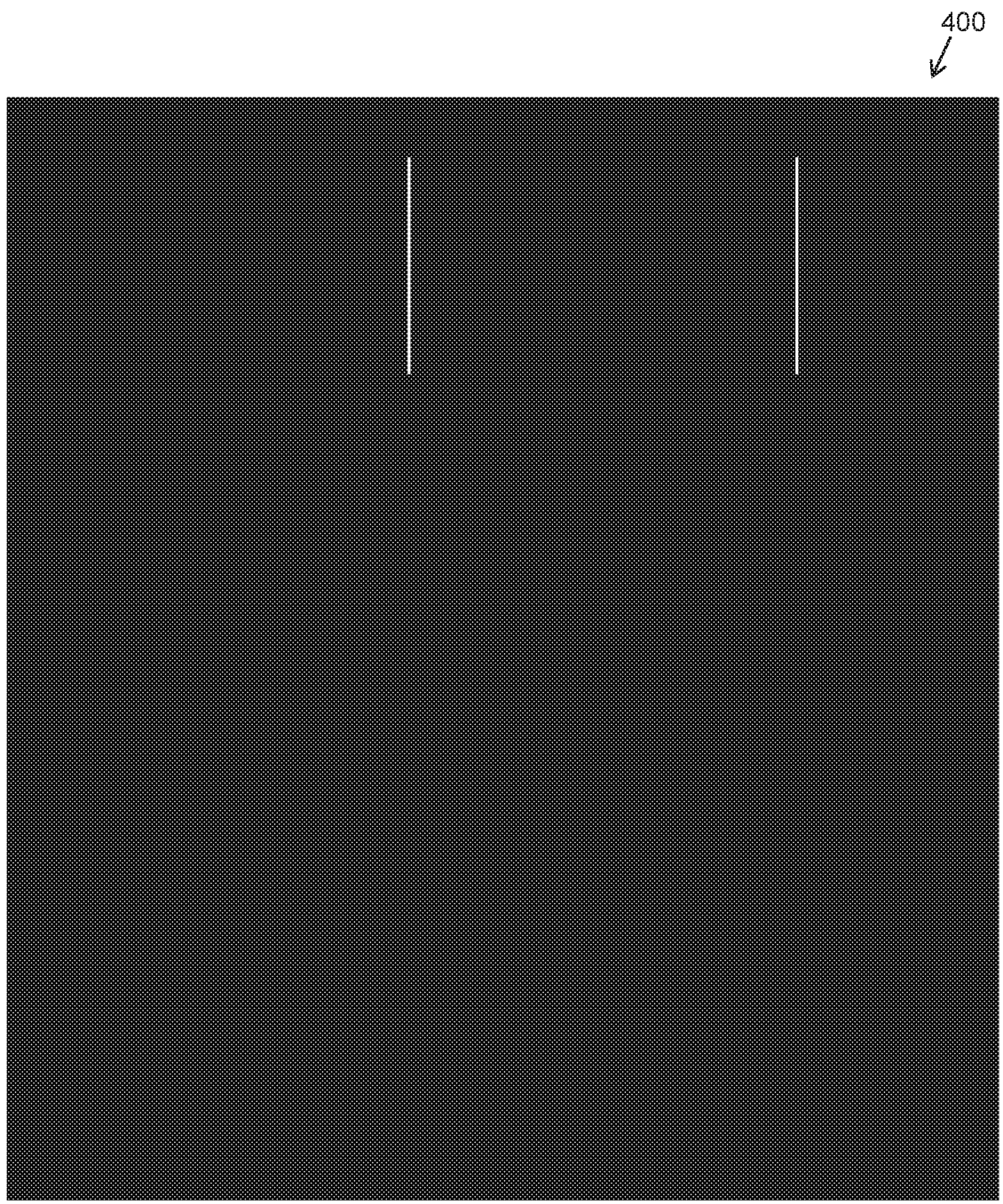
Figure 2D:
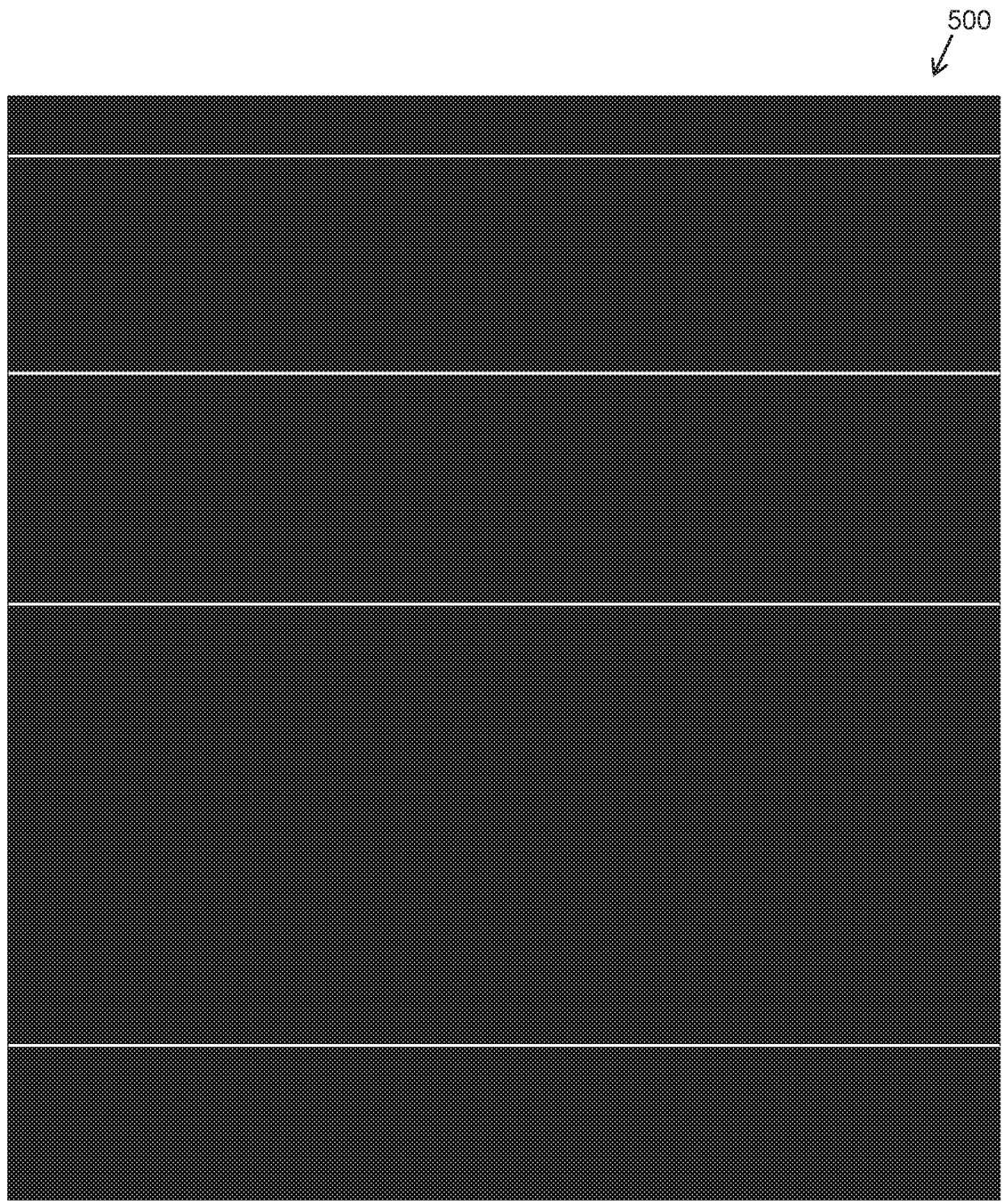
Figure 2E:
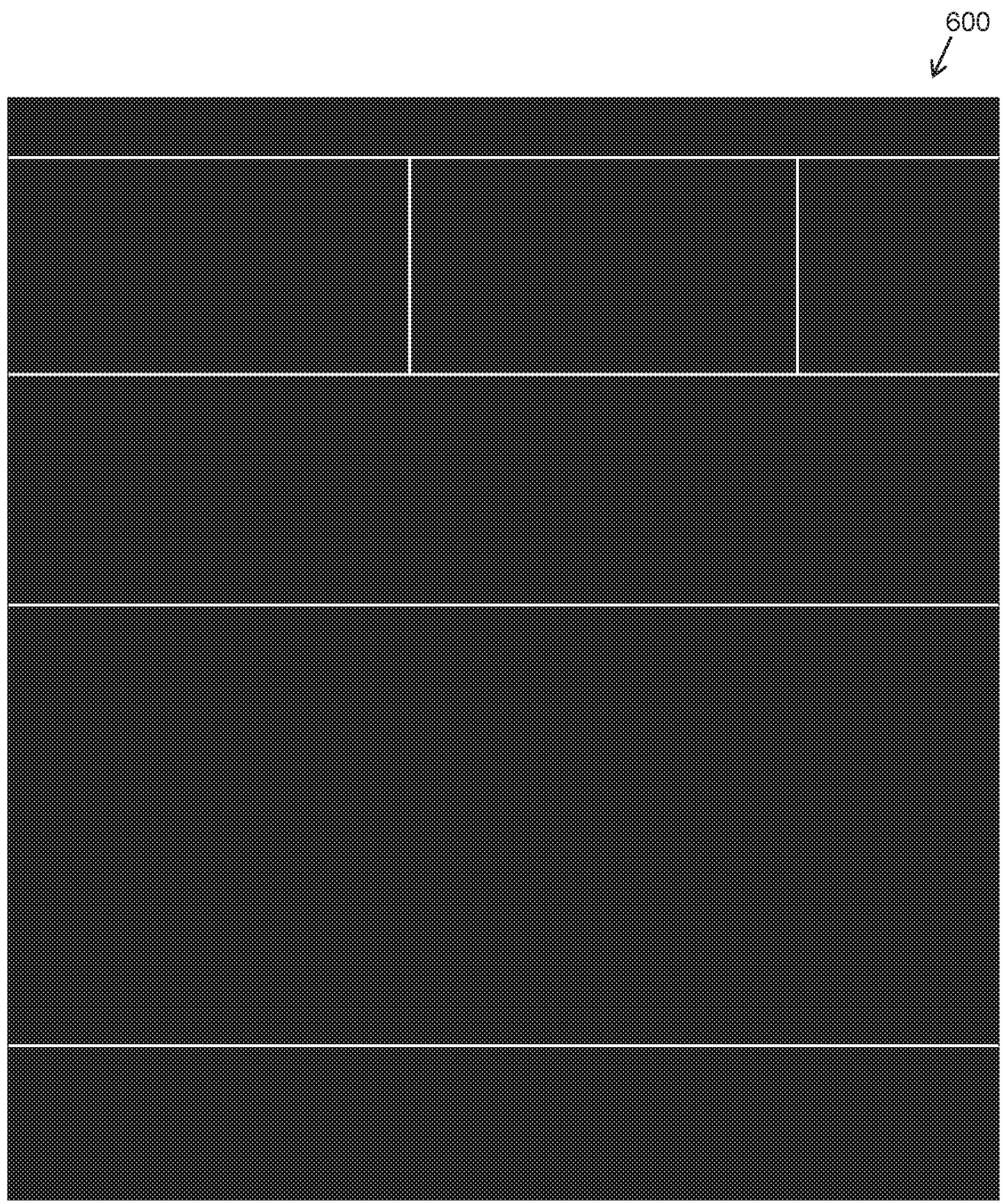
Figure 2G:
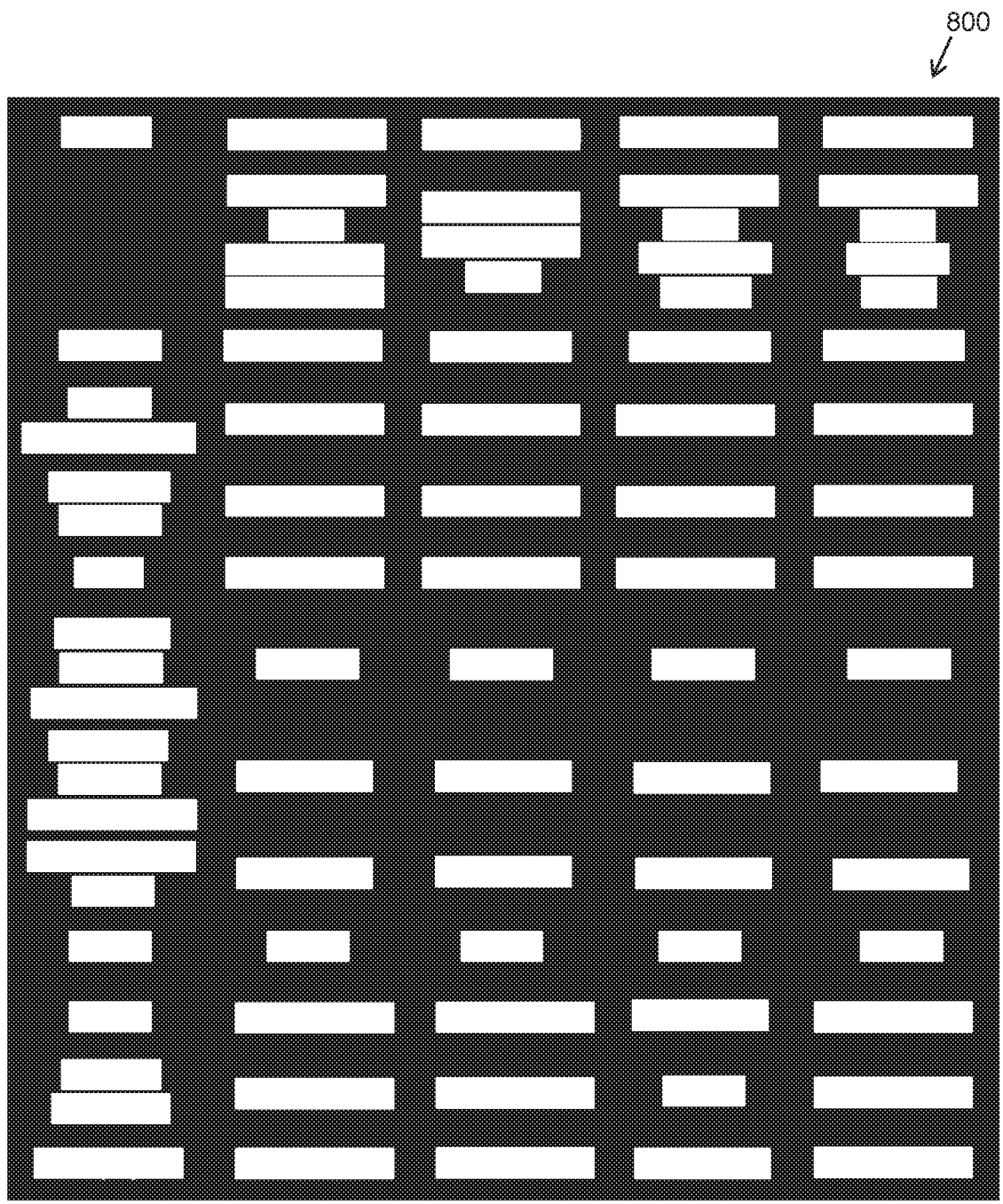
Figure 3A:
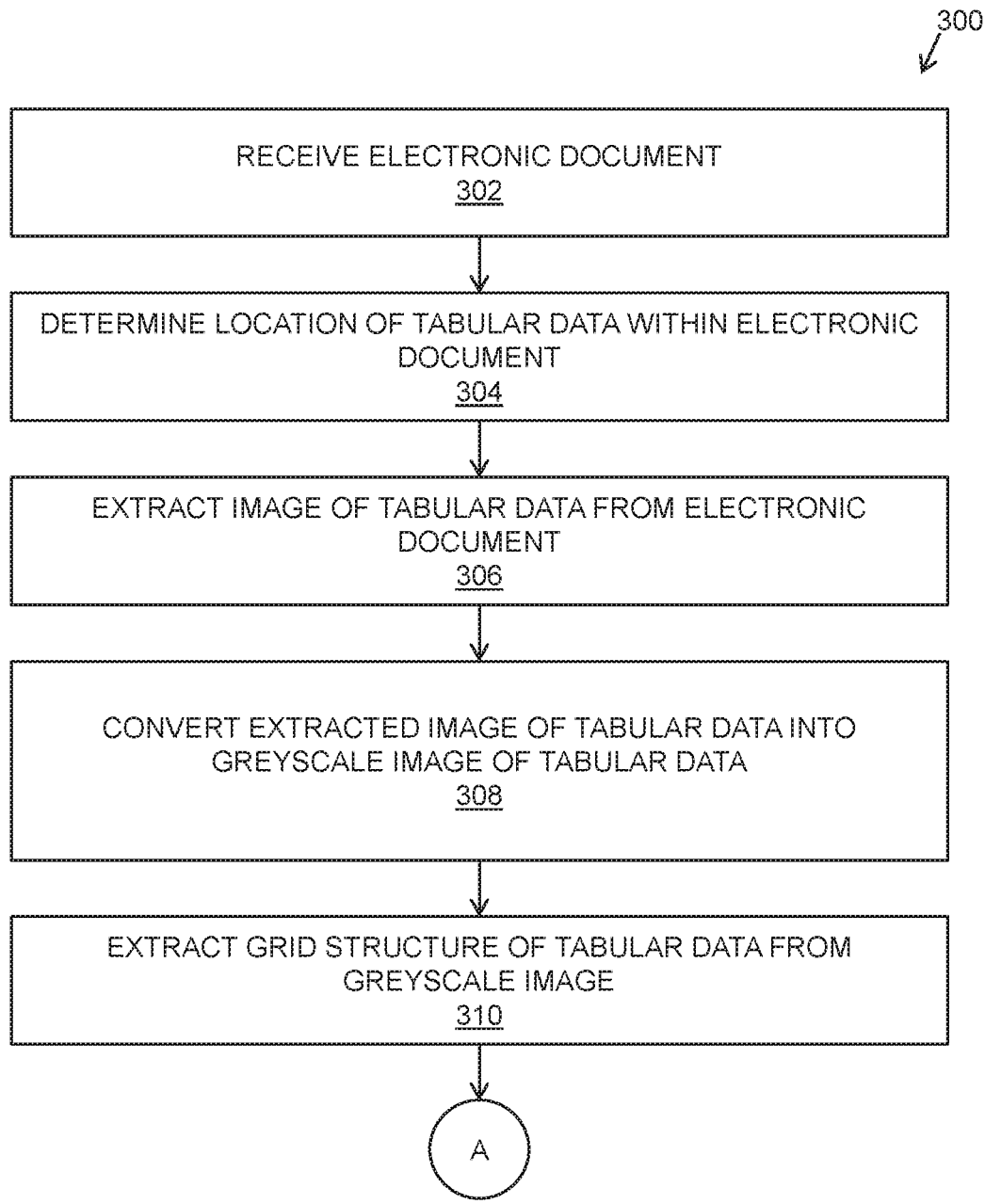
Figure 3B:
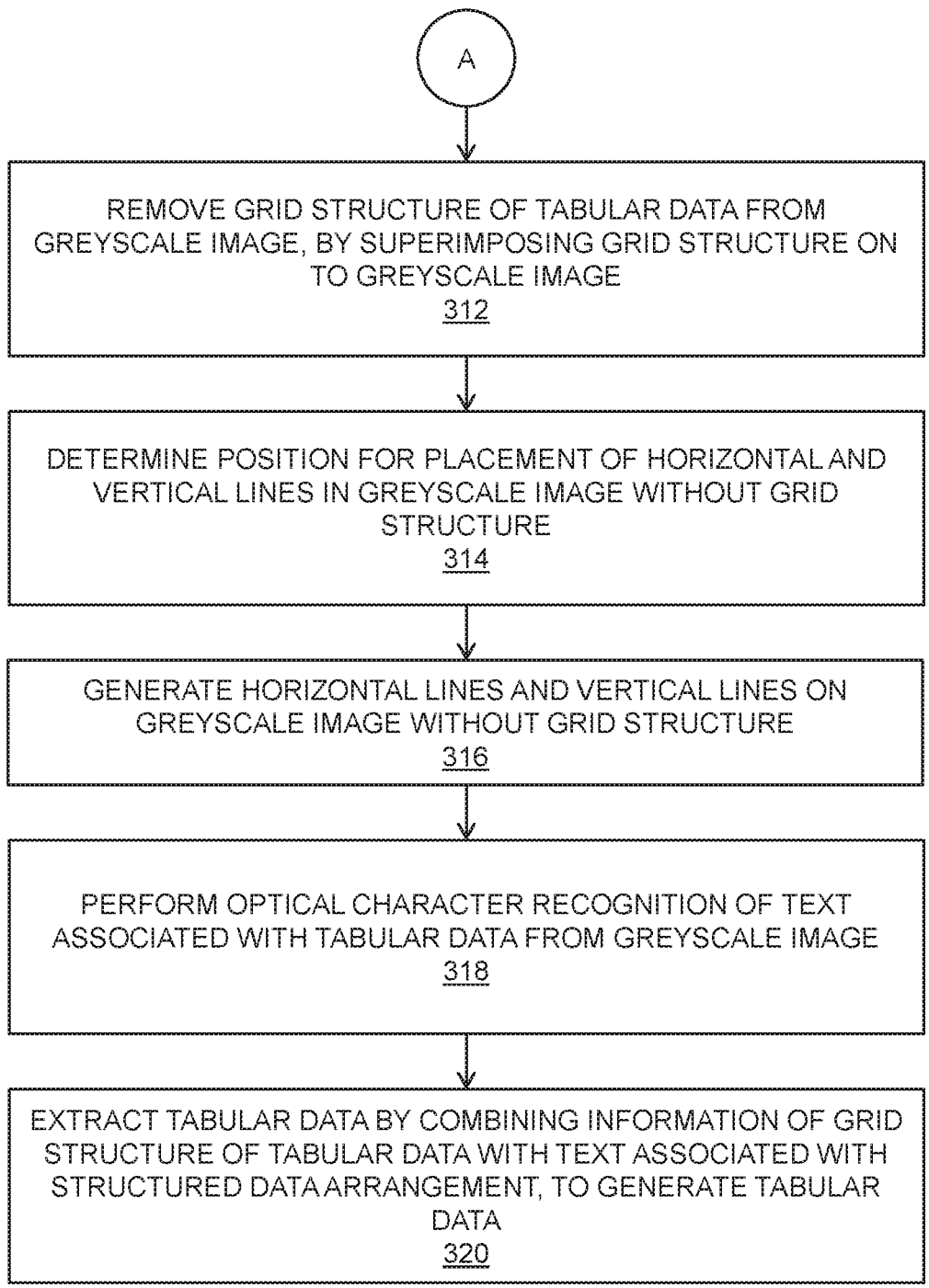

Embodiments of the present disclosure will now be described, by way of example only, with reference to the following diagrams wherein:

FIG. 1 is a block diagram of a system for extracting a tabular data from an electronic document, in accordance with an embodiment of the present disclosure;

FIGS. 2A-H are exemplary tabular data associated with operation of the system of FIG. 1, in accordance with an embodiment of the present disclosure; and FIGS. 3A-B illustrate steps of a method for extracting a tabular data from an electronic document, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for extracting tabular data from an electronic document, the system having a data processing arrangement comprising:
a tabular data detection module that is operable to:
(i) receive the electronic document;
(ii) determine a location of the tabular data within the electronic document; and
(iii) extract an image of the tabular data from the electronic document; and
a tabular data extraction module that receives the extracted image of the tabular data from the tabular data detection module, wherein the tabular data extraction module is operable to:
(i) convert the received image of the tabular data into a greyscale image of the tabular data;
(ii) extract a grid structure of the tabular data from the greyscale image;
(iii) remove the grid structure of the tabular data from the greyscale image, by superimposing the extracted grid structure on to the greyscale image;
(iv) determine a position for placement of horizontal and vertical lines in the greyscale image without the grid structure;
(v) generate horizontal and vertical lines on the greyscale image without the grid structure, to obtain information of grid structure of the tabular data;
(vi) perform optical character recognition of the text associated with the tabular data from the received image, to obtain information of text associated with the tabular data; and
(vii) extract the tabular data by combining the information of the grid structure of the tabular data with the text associated with the tabular data, to generate the tabular data.

In another aspect, an embodiment of the present disclosure provides a method for extracting tabular data from an electronic document, the method comprising:

(i) receiving the electronic document;
(ii) determining a location of the tabular data within the electronic document;
(iii) extracting an image of the tabular data from the electronic document;
(iv) converting the extracted image of the tabular data into a greyscale image of the tabular data;
(v) extracting a grid structure of the tabular data from the greyscale image;
(vi) removing the grid structure of the tabular data from the greyscale image, by superimposing the grid structure on to the greyscale image;
(vii) determining a position for placement of horizontal and vertical lines in the greyscale image without the grid structure;
(viii) generating horizontal lines and vertical lines on the greyscale image without the grid structure, to obtain information of grid structure of the tabular data;
(ix) performing optical character recognition of the text associated with the tabular data from the extracted image, to obtain information of text associated with the tabular data; and
(x) extracting the tabular data by combining the information of the grid structure of the tabular data with the text associated with the tabular data, to generate the tabular data.

In yet another aspect, an embodiment of the present disclosure provides a software product recorded on machine-readable non-transient data storage media, characterized in that the software product is executable upon computing hardware to implement the method for extracting tabular data from an electronic document.

The present disclosure provides the aforementioned system, the aforementioned method, and the aforementioned software product for extracting tabular data from electronic document. The system comprises the data processing arrangement that is operable to extract the tabular data from the electronic document, wherein the data processing arrangement hosts therein and employs in operation, the tabular data detection module and the tabular data extraction module. Such a data processing arrangement can be implemented using customized hardware components that are specifically configured to extract the tabular data from the electronic document by using the tabular data detection module and the tabular data extraction module. Beneficially, the system allows automatic detection of the tabular data from the electronic document, thereby, alleviating problems associated with manual selection of the tabular data by a user. Thus, a time and effort required for the manual selection of the data can be reduced, thereby increasing an efficiency of the user. Furthermore, the system allows extraction of tabular data from the electronic document (such as PDF documents) such that a hierarchy of the tabular data is maintained subsequent to the extraction. It will be appreciated that maintaining the hierarchy of the tabular data subsequent to the extraction enables to maintain an integrity of information represented within the tabular data, thereby enabling convenient, reliable and efficient extraction and interpretation of the tabular data. Thus, the system and the method enable to substantially overcome various problems and limitations associated with the existing methods and tools used for extraction of data and information in tables.

The aforesaid system has the data processing arrangement comprising the tabular data detection module and the tabular data extraction module. Throughout the present disclosure, the term "data processing arrangement" relates to an arrangement of hardware components that is employed for processing data associated with an input, to generate an output. The arrangement of hardware components forming the data processing arrangement can include, for example, a central processing unit (CPU), a random-access memory (RAM), a graphics processing unit (GPU) and so forth. Furthermore, the CPU is operable to execute an instruction set to obtain the output (such as the extracted tabular data) from the input (such as the electronic document) provided to the data processing arrangement. Moreover, the RAM, the GPU and other hardware components associated with the data processing arrangement are operable to synergistically operate with the CPU, to enable the CPU to generate the output from the input.

The CPU of the data processing arrangement can be implemented to have various configurations, for example, as a microprocessor comprising one or more processor cores therein. In such an example, the data processing arrangement can have a dual-core configuration, a quad-core configuration, a hexa-core configuration, an octa-core configuration, a deca-core configuration and so forth. Furthermore, a preference of the configuration of the data processing arrangement depends on requirements of the process, such as, a performance efficiency, a power consumption, and/or a time required for generating the output from the input. Furthermore, it will be appreciated that the data processing arrangement having the microprocessor therein (and thus, the system) can be implemented in a device including, but not limited to, a laptop computer, a tablet computer, a smartphone, a personal digital assistant (PDA) and so forth.

The data processing arrangement is operable to host one or more software modules therein. Throughout the present disclosure, the term "software module" relates to a collection or a set of routines responsible for executing an instruction or a sub-set of instructions from the instruction set that is executed by the data processing arrangement, to generate a specific output from an input. For example, the data processing arrangement may be operable to host a first software module (such as the tabular data detection module) and a second software module (such as the tabular data extraction module) therein. In such an example, the first software module (such as the tabular data detection module) can be associated with an instruction pipeline (such as a deep learning-based table detection pipeline) corresponding to a plurality of instructions executed by the data processing arrangement, wherein the first software module enables the data processing arrangement to generate an intermediate output from a provided input. Subsequently, the second software module (such as the tabular data extraction module) can be associated with a different instruction pipeline (such as a computer vision-based table extraction pipeline) executed by the data processing module, wherein the second software module receives the intermediate output as an input thereto, and generates a final output that is required to be generated by operation of the data processing arrangement. It will be appreciated that in such an instance, the first software module and the second software module synergistically enable the data processing module to generate the output from the input provided thereto. In the aforesaid system, the data processing arrangement is operable to extract an output corresponding to tabular data, from an input of an electronic document comprising the tabular data therein. In such an instance, the tabular data detection module and the tabular data extraction module synergistically enable the data processing module to extract the tabular data from the electronic document. Therefore, references to an operation of tabular data detection module and/or the tabular data extraction module throughout the present disclosure is meant to be understood in terms of a corresponding operation of the data processing arrangement via the tabular data detection module and/or the tabular data extraction module respectively.

Throughout the present disclosure, the term "tabular data" relates to representation of data in a form of a proper and well-defined format and structure (or hierarchy), in order to enhance visual representation, interpretation and extraction of the data. The tabular data helps in maintaining the hierarchy of the data, as well as enables classification of the data represented therein. The tabular data can include structured data arrangements like a grid structure, a table, and so forth. Optionally, the tabular data can comprise a flowchart.

Throughout the present disclosure, the term "electronic document" relates to an electronic media that can comprise one or more forms of content therein. The electronic document can exist in different formats, such as, a Portable Document Format file (having .pdf extension), a document generated using a word-processing software (such as, a file having .doc or .docx extension), a web text document (.html or .htm extension), adobe postscript document (.ps extension), and so forth. Furthermore, the electronic document can comprise the one or more forms of content including unstructured data arrangements such as textual data, images and so forth, and structured data arrangements such as tabular data, charts, histograms and so forth. Moreover, the electronic document can comprise a single tabular data (such as a single table) or a plurality of the tabular data. The electronic document can be the Portable Document Format file having the tabular data therein. Such an electronic document enables easy communication (such as transmission and receipt) of the tabular data between different individuals, as well as convenient interpretation and extraction of the information from the tabular data. However, when the tabular data is required to be extracted from the Portable Document Format file, such as by copying the tabular data from the Portable Document Format file, the tabular data loses the format and structure (or hierarchy) thereof, thereby making the extracted data useless to a user.

The tabular data detection module is operable to receive the electronic document. Optionally, the system comprises a database arrangement communicatively coupled to the data processing arrangement, wherein the database arrangement is operable to store the electronic document therein. Such a database arrangement can comprise at least one database for storing the electronic document and the database arrangement can be coupled to the data processing arrangement using a wired or a wireless communication network. It will be appreciated that the term "database" generally refers to hardware, software, firmware, or a combination of these for storing information in an organized manner, thereby, allowing for easy storage, access (namely, retrieval), updating and analysis of the data. Furthermore, the database arrangement is communicatively coupled to the data processing arrangement using the wired communication network; the wireless communication network that can be implemented as a Local Area Network (LAN), a Wireless Local Area Network (WLAN), WiFi®, Internet, Bluetooth® and so forth; or a combination of the wired communication network and the wireless communication network. In such an instance, the data processing arrangement is operable to receive the electronic document from the database arrangement, such as, from the at least one database. More optionally, the system comprises a memory communicatively coupled to the data processing arrangement, wherein the memory is operable to store the electronic document therein. For example, the memory can be implemented as a non-volatile memory (such as a Secure Digital card, a hard disk drive and so forth) incorporated within a device (such as, a laptop computer, a tablet computer, a smartphone, a personal digital assistant (PDA) and so forth) comprising the data processing arrangement therein. In such an instance, the data processing arrangement is operable to receive the electronic document from the memory associated with the device.

Furthermore, subsequent to the tabular data detection module receiving the electronic document, the tabular data detection module is operable to determine the location of the tabular data within the electronic document. It will be appreciated that the electronic document can comprise a plurality of tabular data on various pages thereof. In such an instance, the tabular data detection module is operable to determine the location of each of the plurality of tabular data within the electronic document. Such a determination of the location of the tabular data comprises determining coordinates associated with the tabular data within the electronic document. For example, the coordinates of the tabular data can comprise an x-axis coordinate and a y-axis coordinate thereof within a page. Such coordinates of the tabular data can comprise coordinates of edges of the tabular data, and/or coordinates of corners of the tabular data. In such an example, the tabular data detection module is operable to employ an edge detection technique for the determination of coordinates of the tabular data. Optionally, the location of the tabular data can further comprise a page number of the electronic document wherein the tabular data was detected and a total number of pages within the electronic document.

Optionally, the tabular data detection module employs deep-learning. The tabular data detection module employs deep-learning for determining the location of the tabular data within the electronic document. The term "deep-learning" as used throughout the present disclosure, refers to machine learning techniques that comprise networks (such as, artificial neural networks (ANN), recurrent neural networks (RNN), convolutional neural networks (CNN) and so forth) of nodes (such as artificial neurons) capable of semi-supervised learning or supervised learning from sample electronic documents comprising various forms of tabular data therein. In such an instance, the tabular data detection module can be trained to detect the location of the tabular data within the electronic document, such as, by providing a plurality of sample electronic documents comprising various forms of tabular data to the tabular data detection module to perform machine learning. Furthermore, the tabular data detection module can be trained to classify whether a given area of an electronic document comprises or does not comprise tabular data, based on machine learning.

It will be appreciated that such networks of nodes employed in the machine learning, imitates working of a human brain while determining the location of tabular data, wherein the networks may be capable of creating clusters or patterns (such as, patterns associated with presence of tabular data within electronic documents) for use in decision making. The tabular data detection module employing deep-learning can detect ideal tabular data having horizontal and vertical lines therein (such that rows and columns of the tabular data are formed by a grid structure), or unideal tabular data having only vertical lines, only horizontal lines, and having no horizontal and vertical lines therein (such that the rows and columns of the tabular data are formed by white-spaces instead of a grid structure).

Optionally, the tabular data detection module is operable to determine the location of the tabular data within the electronic document, based on a confidence score associated with detection of the tabular data within the electronic document being higher than a predefined threshold score. Optionally, during training of the tabular data detection module to determine the location of tabular data, the tabular data detection module can additionally be trained to assign a confidence score to each tabular data detected within the electronic document. Throughout the present disclosure, the term "confidence score" relates to a numerical value assigned by the tabular data detection module to each tabular data detected within the electronic document. It will be appreciated that a higher numerical value of the confidence score corresponds to a higher likelihood that the detected tabular data is in fact located at the determined location thereof. For example, the confidence score can be 50%, 66%, 72%, 80%, 92%, 97% or 100%. Throughout the present disclosure, the term "threshold score" relates to a minimum confidence score that the detected tabular data is required to be associated therewith for successful detection of the tabular data at a given location. Furthermore, the threshold score can be provided as a criterion via an input by a user of the system, wherein the criterion is used, in operation, by the tabular data detection module. For example, the threshold score can be 50%, 75%, 90%, 95%, 99% or 100%. In an example, the threshold score for successful determination of tabular data within a specific location in an electronic document is 96%. In such an example, a given tabular data is assigned the confidence score of 95% by the tabular data detection module. Consequently, the given tabular data is unsuccessfully determined to be located at the specific location within the electronic document. In another example, the threshold score is 96% and a determined location of a given tabular data is assigned the confidence score of 98%. In such an instance, the given tabular data is successfully determined to be located at the determined location thereof. It will be appreciated that a higher threshold score for determination of locations of tabular data enables to reduce occurrence of false positives associated with successful determination of tabular data at inaccurate locations. However, a number of successfully determined locations of tabular data within the electronic document may also decrease. Conversely, a lower threshold score for determination of locations of tabular data may increase the occurrence of false positives but may improve the number of successfully determined locations of tabular data within the electronic document. Therefore, the threshold score is required to be appropriately chosen so as to reduce the number of false positives while improving the number of successfully determined locations of tabular data within any electronic document.

The tabular data detection module extracts the image of the tabular data from the electronic document. The tabular data detection module is operable to extract the image of the tabular data from the electronic document, for example, by capturing an image of an area of the electronic document comprising the tabular data therein. Optionally, the tabular data detection module is operable to extract the image of the tabular data by generating a bounding box around the tabular data within the electronic document. Throughout the present disclosure, the term "bounding box" relates to a rectangular shape that is generated by the tabular data detection module on the area of the electronic document comprising the tabular data, wherein the generated rectangular shape completely encompasses the tabular data. It will be appreciated that the area of a single generated bounding box corresponds to a total area of a page of an electronic document covered by a single tabular data. For example, the area of the single bounding box can correspond to an area (within margins) of a page of an electronic document if a given tabular data is represented to completely cover the page (within margins) of the electronic document. However, most tabular data will generally cover smaller areas within pages of electronic documents, such as, areas within 50% of pages of the electronic document. Optionally, the area of the single bounding box can extend to multiple pages if a single tabular data exists on multiple pages of the electronic document. In such an instance, the generated bounding box will correspond to an area bigger than the total area of each page of the electronic document. Subsequently, the tabular data detection module is operable to extract an image of the area within the bounding box of the electronic document as the image of the tabular data. Furthermore, the image can be extracted to be associated with one or more image fileformats, including but not limited to, .jpg, .png, .bmp, .gif and so forth.

Furthermore, the data processing arrangement comprises the tabular data extraction module that receives the extracted image of the tabular data from the tabular data detection module. As mentioned hereinbefore, the tabular data extraction module synergistically operates with the tabular data detection module, to enable the data processing module to extract, in operation, tabular data from various electronic documents provided as inputs to the data processing module. The tabular data extraction module converts the received image of the tabular data into the greyscale image of the tabular data. Throughout the present disclosure, the term "greyscale image" relates to a monochromatic image comprising pixels having different shades of grey colour. It will be appreciated that the different shades of grey colour are formed by combinations of black and white colours in varied proportions, for example, such as a dark shade of grey colour in which the black colour is in maximum proportion while the white colour is in minimum proportion, and a light shade of grey colour in which the black colour is in minimum proportion while the white colour is in maximum proportion. Such a conversion of the extracted image into the greyscale image enables to minimize complications that may arise during processing of colour images by the tabular data extraction module, such as, by employing computer visionbased image processing techniques. Furthermore, as the greyscale image is associated with a less amount of information about the pixels of the image as compared to a RGB (red, green, and blue) image, conversion of the received image to the greyscale image further aids in processing (such as, to enable faster processing) thereof by the tabular data extraction module.

In an example, the received image of the tabular data is converted into the greyscale image by extracting values of red colour, green colour and blue colour in a pixel of the received image of the tabular data and thereafter, a mathematical function is used to convert the extracted values of red colour, green colour and blue colour into different shades of grey colour. Subsequently, the pixels of the received image having the red colour, green colour and blue colour are replaced by corresponding pixels having the shades of grey colour.

Optionally, the system comprising the tabular data extraction module is further operable to perform thresholding of the greyscale image subsequent to converting the received image into the greyscale image, wherein the thresholding of the greyscale image is performed by employing adaptive Gaussian technique. Throughout the present disclosure, the term "thresholding" relates to classifying the pixels of the greyscale image into two groups to obtain a binary image having only two colours therein, wherein the pixels are classified based on a threshold intensity value. The pixels having the intensity less than the threshold intensity value (such as, pixels associated with light shades of grey) are classified into a first group and the pixels having the intensity more than the threshold intensity value (such as, pixels associated with dark shades of grey) are classified into a second group. As a result, the greyscale image having pixels of various shades of grey will be converted into a thresholded greyscale image having pixels with only black colour and white colour respectively, wherein the pixels having the black colour correspond to pixels of the greyscale image for all intensity values less than the threshold intensity value and the pixels having the white colour correspond to pixels of the greyscale image for all intensity values more than the threshold intensity value. Furthermore, performing the thresholding of the greyscale image segments the thresholded greyscale image, such that a background of the thresholded greyscale image associated with blank space, is clearly separated from a foreground of the thresholded greyscale image associated with text and grid structure of the tabular data.

Furthermore, the adaptive Gaussian technique is employed for thresholding the greyscale image. Throughout the present disclosure, the term "adaptive Gaussian technique" relates to a thresholding technique that employs intensity values of pixels proximate to a given pixel (such as neighbouring pixels), to classify the given pixel into the first group or the second group. Furthermore, the adaptive Gaussian technique considers a weighted sum of intensity values of pixels proximate to the given pixel and the distance of the proximate pixels from the given pixel, to classify the given pixel into the first group or the second group. Moreover, the adaptive Gaussian technique segments the greyscale image into a plurality of sub-images based on variations in the greyscale image (such as, based on variations in the background of the greyscale image) and subsequently, considers dynamic threshold intensity values for each sub-image, based on the weighted mean of intensity values of pixels proximate to a given pixel within the sub-image and a constant value. It will be appreciated that performing the thresholding of the greyscale image by considering the dynamic threshold intensity values (by employing the adaptive Gaussian technique) enables to improve clarity and accuracy associated with the thresholded greyscale image.

Optionally, the tabular data extraction module is further operable to perform bilateral filtering of the greyscale image subsequent to performing the thresholding of the greyscale image. Throughout the present disclosure, the term "bilateral filtering" relates to an image processing technique in which smoothing of an image is performed by employing a smoothing filter (or a bilateral filter), wherein an intensity of a given pixel within the image is substituted with an intensity value corresponding to a weighted mean of intensity values of pixels proximate to the given pixel. Furthermore, the smoothing is performed while preserving edges within the image and reducing noise therein, thereby, resulting in increased clarity of the thresholded greyscale image.

The tabular data extraction module extracts the grid structure of the tabular data from the greyscale image. Throughout the present disclosure, the term "grid structure" relates to an arrangement of horizontal and vertical lines forming the tabular data. For example, the tabular data may be formed by 10 horizontal lines and 10 vertical lines, such that the tabular data comprises 9 rows and 9 columns therein. It will be appreciated that the 10 horizontal lines and the 10 vertical lines of the tabular data intersect with each other to form a plurality of cells (such as, 9×9 or 81 cells), wherein each of the plurality of cells may or may not contain data (such as text or images) therein. In such an instance, the tabular data extraction module is operable to extract information associated with the horizontal lines and the vertical lines forming a tabular data.

Optionally, the tabular data extraction module is operable to extract the grid structure from the greyscale image by performing morphological dilation and morphological erosion. The tabular data extraction module is operable to perform a morphological operation on the greyscale image by using a structural element (for example, a sliding window). Throughout the present disclosure, the term "morphological operation" relates to an image processing technique wherein pixels of an image are manipulated based on shapes of objects represented in the image. Furthermore, the morphological operation employs a structural element that is used to detect the shapes of the objects and subsequently, pixels associated with the detected objects can be manipulated. Throughout the present disclosure, the term "structural element" relates to a template having a predefined shape that is used for performing the morphological operation. In an example, the structural element can have a rectangular shape. The tabular data extraction module is operable to perform the morphological operations by using the structural element to detect the horizontal and vertical lines in the greyscale image, by moving and subsequently positioning the structural element along all regions of the greyscale image. For example, the tabular data extraction module is operable to move and position the structural element horizontally along the greyscale image to detect positions of the various horizontal lines therein. Subsequently, the tabular data extraction module is operable to move and position the structural element vertically along the greyscale image to detect positions of the various vertical lines therein. Such a morphological operation comprises operations of morphological dilation and morphological erosion respectively.

Throughout the present disclosure, the term "morphological dilation" relates to an operation wherein pixels are added to a boundary of objects detected within an image. Throughout the present disclosure, the term "morphological erosion" relates to an operation in which pixels are removed from the boundary of objects detected within the image, such as, by removing an outermost layer of pixels associated with the objects represented within the image. The tabular data extraction module is operable to perform the morphological dilation and erosion of the detected horizontal and vertical lines within the greyscale image, such that the detected lines are associated with a required (or uniform) pixel density. For example, if a first horizontal line of a plurality of detected horizontal lines is associated with more thickness (or higher pixel density) than other horizontal lines, the tabular data extraction module is operable to perform morphological erosion of the first horizontal line such that all of the plurality of detected horizontal lines are associated with a uniform pixel density. Similarly, if a first vertical line of a plurality of detected vertical lines is associated with less thickness (or lower pixel density) than other vertical lines, the tabular data extraction module is operable to perform morphological dilation of the first vertical line such that all of the plurality of detected vertical lines are associated with a uniform pixel density. It will be appreciated that by performing such morphological erosion and dilation of the detected horizontal and vertical lines such that the horizontal and vertical lines have the uniform pixel density, the tabular data extraction module reduces a complication associated with processing the lines having varying pixel densities, thereby reducing errors associated with processing of the detected horizontal and vertical lines.

Optionally, the tabular data extraction module is operable to perform the morphological dilation and the morphological erosion by using a structural element having a specific size, and wherein the size of the structural element is determined based on a page size of the electronic document. Throughout the present disclosure, the term "page size" relates to dimensions of a page of the electronic document wherein the tabular data exists, the dimensions of the page including a height and a width of the page. For example, such a height and width of the page can be represented as an actual length and width of the page (such as, in centimetres, millimetres and so forth) or as a number of pixels along the height and width of the page. Furthermore, the size of the structural element is determined based on the page size of the electronic document, such as, a structural element having bigger dimensions is used on a page associated with a large page size as compared to a structural element that is used on a page associated with a small page size. It will be appreciated that such a variation in the dimensions of the structural element based on the page size enables to compensate for variations in page sizes of various pages within a single electronic document, or for variations between multiple electronic documents that may have varied page sizes. In such an instance, choosing the bigger structural element enables to reduce an amount of processing required for detecting the grid structure within the electronic document having pages with large page sizes and choosing the smaller structural element enables to reduce errors associated with detection of grid structure within the electronic document having pages with small page sizes.

In an example, a structural element having dimensions of (1, 25) or a height of 25 pixels and a width 1 pixel will detect vertical lines of height 25 pixels and width of 1 pixel within the electronic document. In such an example, the structural element may be operable to perform morphological operations of morphological dilation and morphological erosion by adding (or removing) a single layer of pixels to a boundary (such as to either side) of the detected vertical lines. In another example, a structural element having dimensions of (25, 1) or a height of 1 pixel and a width of 25 pixels will detect horizontal lines of height 1 pixel and width of 25 pixels within the electronic document. In such an example, the structural element may be operable to perform morphological operations of morphological dilation and morphological erosion by adding (or removing) a single layer of pixels to a boundary of the detected horizontal lines.

Subsequently, the tabular data extraction module extracts the arrangement of horizontal lines and the arrangement of vertical lines from the greyscale image, for example, as a pixel array of pixels forming the horizontal lines and the vertical lines. Thereafter, the tabular data extraction module is operable to combine the pixels arrays associated with the horizontal lines and the vertical lines to obtain a pixel array corresponding to the grid structure of the tabular data. Optionally, the grid structure removed from the greyscale image is a NumPy (Numeric python) array of pixels. The coordinates of the pixels of the grid structure comprising the horizontal and vertical lines is extracted and subsequently, stored as the NumPy array of pixels. It will be appreciated that such storing of the grid structure as the NumPy array of pixels enables to store the positions of the pixels corresponding to the horizontal and vertical lines of the grid structure, thereby, providing accurate, efficient and reliable storage and subsequent use of the grid structure.

Furthermore, the tabular data extraction module is operable to remove the grid structure of the tabular data from the greyscale image, by superimposing the extracted grid structure on to the greyscale image. The grid structure which is extracted from the greyscale image by performing the morphological dilation and the morphological erosion by using the structural element, is used for removing the grid structure from the greyscale image. In such an instance, the tabular data extraction module is operable to position the extracted grid structure on to greyscale image. Furthermore, the extracted grid structure is positioned such that horizontal and vertical lines of original grid structure of the greyscale image superimpose with (or are covered by) the horizontal and vertical lines of the extracted grid structure. Subsequently, tabular data extraction module is operable to remove the original grid structure from the greyscale image, for example, by extracting areas of the greyscale image that do not correspond to the superimposition of the original and extracted grid structures respectively.

Optionally, the tabular data extraction module is further operable to remove the grid structure of the tabular data from the received image, by superimposing the grid structure extracted from the greyscale image on to the received image. In such an instance, the tabular data extraction module is operable to position the grid structure extracted from the greyscale image and subsequently, superimpose the extracted grid structure over an original grid structure of the received image. Thereafter, the tabular data extraction module is operable to remove the original grid structure from the received image, for example, by extracting areas of the received image that do not correspond to the superimposition of the original grid structure of the received image and the extracted grid structure of the greyscale image. Such a received image without the grid structure can be used by the tabular data extraction module as a reference to verify presence (or absence) of one or more horizontal and/or vertical lines that may not be removed by superimposition of the extracted grid structure on to the greyscale image. In such an instance, if one or more horizontal and/or vertical lines are determined to be present in the greyscale image without the grid structure but absent in the received image without the grid structure, the one or more horizontal and/or vertical lines are determined to be unnecessary lines and are consequently, removed from the greyscale image without the grid structure.

Optionally, the tabular data extraction module is further operable to remove salt and pepper noise from the greyscale image without the grid structure and/or the received image without the grid structure subsequent to removing the grid structure therefrom, and wherein the salt and pepper noise is removed using median filtering. Throughout the present disclosure, the term "salt and pepper noise" relates to a computer-generated noise in an image, wherein the salt and pepper noise can be identified by presence of unwanted and stray pixels within the image. For example, the salt and pepper noise can be identified by presence of pixels having white colour values in a group of pixels having black colour values, and presence of pixels having black colour values in a group of pixels having white colour values within a greyscale image. Such salt and pepper noise can be removed from the image by using a smoothing filter, such as by performing median filtering or morphological filtering on the image.

Throughout the present disclosure, the term "median filtering" relates to a non-linear digital filtering technique wherein a median filter is employed for removing the salt and pepper noise from the greyscale image and also, preserving edges of objects within the greyscale image. Such a median filtering technique involves use of a structural element (for example, a sliding window) along the greyscale image, such that the structural element obtains and processes an intensity of a given pixel within the structural element and substitutes the intensity with a median intensity of pixels proximate to the given pixel.

Moreover, the tabular data extraction module is operable to determine a position for placement of horizontal and vertical lines in the greyscale image without the grid structure. It will be appreciated that subsequent to removal of the grid structure from the greyscale image, white-spaces (or blank areas) will correspond to position of the removed grid structure (or positions of horizontal and vertical lines of the grid structure). Optionally, when the tabular data comprises only horizontal or vertical lines therein, possible positions for placement of vertical lines or horizontal lines respectively can be identified as white-spaces within the greyscale image, for accurately identifying the hierarchy of the tabular data. In such instances, the tabular data extraction module is operable to determine the white-spaces wherein horizontal or vertical lines can be created within the greyscale image without the grid structure.

Optionally, the tabular data extraction module is operable to determine the position for placement of horizontal and vertical lines in the greyscale image without the grid structure by using a sliding window to perform a bitwise ANDing operation of each pixel of the greyscale image without the grid structure and an array of ones, and wherein an output of the bitwise ANDing operation is a pixel array. Throughout the present disclosure, the term "sliding window" relates to a template having a predefined shape that is gradually moved across and subsequently, positioned over all regions of the greyscale image without the grid structure. The term "array of ones" relates to an array (or a matrix) wherein all positions of the array are occupied by number 1. It will be appreciated that a size of such an array of ones will correspond to a size of the greyscale image without the grid structure, such that a number of 1 s within the array of ones will be same as a number of pixels within the greyscale image without the grid structure. Furthermore, the term "bitwise ANDing operation" relates to a logical AND operation that is performed between each pixel of the greyscale image without the grid structure and the array of ones. Optionally, the pixel array comprises ones at locations in the greyscale image without the grid structure associated with presence of text, and zeros at locations in the greyscale image without the grid structure corresponding to possible positions for placement of horizontal and vertical lines in the greyscale image without the grid structure. In such an instance, the 1 s in the array of ones that correspond to pixels associated with text in the greyscale image without the grid structure will remain 1 s after the bitwise ANDing operation. However, the 1 s in the array of ones that do not correspond to pixels associated with text in the greyscale image without the grid structure will be converted to 0 s. Thus, an output generated from the bitwise ANDing operation is a pixel array, wherein the pixels corresponding to 1 s in the array of ones will identify text of the tabular data, and blank spaces corresponding to Os in the array of ones will identify possible positions for placement of horizontal and vertical lines in the greyscale image without the grid structure. It will be appreciated that employing such a pixel array for determining the possible positions for placement of horizontal and vertical lines, enables to reduce errors that may be caused due to varying intensities of pixels in the greyscale image without the grid structure, thereby enabling accurate placement of the horizontal and vertical lines and also, requiring less processing for by the tabular data extraction module for performing such an operation.

Optionally, the tabular data extraction module is further operable to perform morphological dilation of the greyscale image without the grid structure prior to performing the bitwise ANDing operation. The tabular data extraction module is operable to perform the morphological dilation on the greyscale image by increasing a number of pixels (such as, by adding one or more layers of pixels) along a boundary of the text in the greyscale image without the grid structure. It will be appreciated that by increasing the number of pixels corresponding to the text in the greyscale image without the grid structure, a number of the possible positions for placement of horizontal and vertical lines in the greyscale image without the grid structure can be reduced. As a result, processing required to be performed by the tabular data extraction module for determining such possible positions and also, for the placement of the horizontal and vertical lines is significantly reduced, thereby enabling faster processing and minimizing time taken for delivering the output.

Optionally, the tabular data extraction module is further operable to determine an ideal position for placement of each horizontal and vertical line in the greyscale image without the grid structure, by filtering redundant positions from all possible positions for placement of horizontal and vertical lines in the greyscale image without the grid structure. Subsequent to performing the morphological dilation on the greyscale image without the grid structure (such that the number of possible positions for placement of horizontal and vertical lines in the greyscale image without the grid structure are reduced), an ideal position for placement of each horizontal and vertical line among the possible positions of the horizontal and vertical lines is determined by the tabular data extraction module. Thereafter, the tabular data extraction module is operable to filter the redundant positions from all possible positions for placement of each horizontal and vertical line. For example, the tabular data extraction module is operable to identify a first horizontal line, such as an uppermost horizontal line, of a plurality of horizontal lines associated with possible position for placement of a horizontal line at a given position. Subsequently, the tabular data extraction module is operable to identify presence of text between the first horizontal line and a next horizontal line (such as a horizontal line underneath the first horizontal line) for the same given position. Furthermore, when no text is determined to be present between the first horizontal line and the next horizontal line, the tabular data extraction module is operable to remove the next horizontal line. Similarly, the tabular data extraction module is operable to iteratively remove all horizontal lines underneath the first horizontal line until text is determined to be present between the first horizontal line and the next horizontal line. In such an instance, the first horizontal line will correspond to the ideal position for placement of the horizontal line at the given position. Similarly, the tabular data extraction module is operable to determine the ideal position for placement of vertical lines from all possible positions, by removing vertical lines to a right (or left) of a vertical line at a given position until no text is determined to be present therebetween. Thus, the tabular data is operable to determine a single position for placement of each horizontal and vertical line associated with the tabular data, thereby reducing inconsistencies associated with presence of multiple redundant lines therein.

The tabular data extraction module is operable to generate horizontal and vertical lines on the greyscale image without the grid structure, to obtain information of grid structure of the tabular data. Optionally, the tabular data extraction module is operable to generate the horizontal lines and vertical lines on the greyscale image without the grid structure, by rotating orthogonally the greyscale image without the grid structure and generating horizontal lines on the greyscale image without the grid structure. The greyscale image without the grid structure (having dilated text) is orthogonally rotated clockwise or counter-clockwise and the horizontal lines are generated thereon based upon the determined ideal position for their placement. Subsequently, the tabular data extraction module is operable to generate the vertical lines on the greyscale image without the grid structure based upon the determined ideal position for their placement, such as, by orthogonally rotating back counter-clockwise or clockwise respectively, the greyscale image without the grid structure. However, it will be appreciated that the tabular data extraction module can initially generate the vertical lines on the greyscale image without the grid structure and subsequently, orthogonally rotate the greyscale image without the grid structure to generate the horizontal lines thereon. It will be appreciated that by generating such horizontal and vertical lines on the greyscale image without the grid structure, an ideal grid structure for the tabular data is obtained, such as, when the tabular data comprises only horizontal lines, vertical lines or no horizontal and/or vertical lines therein. Such an ideal grid structure for the tabular data corresponds to information of grid structure of the tabular data and the tabular data extraction module is operable to store the information of grid structure of the tabular data.

Optionally, the tabular data extraction module is further operable to generate the ideal grid structure of the tabular data on the received image, by generating horizontal lines and vertical lines on the received image without the grid structure.

Optionally, the tabular data extraction module is operable to associate regions of the received image with the ideal grid structure of the tabular data. For example, when the tabular data comprises 9 rows and 9 columns forming 81 cells and each cell comprises a snippet of text therein, the tabular data extraction module is operable to associate the regions of the received image having snippets of text, to corresponding cells of the ideal grid structure. In such an example, a region of the received image having snippet of text corresponding to the first row and first column is associated with the first cell of the grid structure by the tabular data extraction module, a region of the received image having snippet of text corresponding to the ninth row and ninth column is associated with the last cell of the grid structure and so forth. More optionally, the tabular data extraction module is operable to associate the regions of the received image having snippet of text by associating a top-left corner (or top-right, bottom-left or bottom-right corner) of each region of the received image to a top-left corner (or top-right, bottom-left or bottom-right corner) of a corresponding cell. It will be appreciated that such an association of the regions of the received image to corresponding cells of the grid structure allows to maintain a same position of the text within the tabular data, as in the tabular data within the electronic document.

Furthermore, the tabular data extraction module is operable to perform optical character recognition (OCR) of the text associated with the tabular data from the received image, to obtain information of text associated with the tabular data. In such an instance, the tabular data extraction module is operable to perform the optical character recognition of the snippets of text within regions of the received image associated with each cell of the ideal grid structure. Subsequently, the tabular data extraction module is operable to store the OCR text with cell-positions thereof, as information of text associated with the tabular data.

Thereafter, the tabular data extraction module is operable to extract the tabular data by combining the information of the grid structure of the tabular data with the text associated with the tabular data, to generate the tabular data. For example, the tabular data extraction module combines the text associated with the tabular data and the information of corresponding cell-positions thereof, with the generated ideal grid structure of the tabular data, to generate (or recreate) the tabular data. Such a recreated tabular data comprises the text in a readable format (OCR text) within appropriate cells of the tabular data, thereby enabling proper format and structure (or hierarchy) of the tabular data to be maintained. Furthermore, such a generated tabular data can be easily copied while maintaining the format and structure (or hierarchy) thereof, thus enabling convenient, efficient and reliable interpretation and extraction of the tabular data.

Optionally, the tabular data extraction module is operable generate the tabular data as an Extensible Markup Language (XML) table. It will be appreciated that such an Extensible Markup Language table enables convenient storage, representation and retrieval of the tabular data while maintaining the format and structure (or hierarchy) thereof. In the present disclosure, the Extensible Markup Language employs a custom tag for storing the text associated with the tabular data in a structured manner.

Optionally, the tabular data extraction module is further operable to generate the tabular data as a comma separated values (CSV) file. For example, the tabular data extraction module is operable to generate the comma separated values file of text by copying text from the Extensible Markup Language (XML) table into a comma separated values (CSV) file. Such a comma separated values file of text is easy to generate, compact in size, and enables faster processing of the data contained therein. Furthermore, the comma separated values file of text allows easy conversion thereof to other different formats, thereby improving accessibility and usability of the generated tabular data. In an example, the tabular data within the comma separated values file can be extracted into a spreadsheet (such as a Microsoft Excel® spreadsheet), a file generated using a word-processing software (such as a Microsoft Word®, a slideshow (such as a slideshow created using Microsoft PowerPoint®), a publisher file, an image file (such as a .jpg image file, a .jpeg image file, a .png image file, a .bmp image file, a .gif image file and so forth) and so forth.

Optionally, generated tabular data is stored in the database arrangement communicatively coupled to the data processing arrangement, thereby allowing easy and convenient accessibility to the generated tabular data.

Furthermore, disclosed is a method for extracting a tabular data from an electronic document. The method comprises receiving the electronic document; determining a location of the tabular data within the electronic document; extracting an image of the tabular data from the electronic document; converting the extracted image of the tabular data into a greyscale image of the tabular data; extracting a grid structure of the tabular data from the greyscale image; removing the grid structure of the tabular data from the greyscale image, by superimposing the grid structure on to the greyscale image; determining a position for placement of horizontal and vertical lines in the greyscale image without the grid structure; generating horizontal lines and vertical lines on the greyscale image without the grid structure, to obtain information of grid structure of the tabular data; performing optical character recognition of the text associated with the tabular data from the extracted image, to obtain information of text associated with the tabular data; and extracting the tabular data by combining the information of the grid structure of the tabular data with the text associated with the tabular data, to generate the tabular data.

Moreover, disclosed is a software product recorded on machine-readable non-transient data storage media, characterized in that the software product is executable upon computing hardware to implement the method for extracting a tabular data from an electronic document.

DETAILED DESCRIPTION OF THE DRAWINGS

Referring to FIG. 1, there is shown is a block diagram of a system 100 for extracting a tabular data from an electronic document, in accordance with an embodiment of the present disclosure. The system 100 includes a data processing arrangement 102 comprising a tabular data detection module 104 and a tabular data extraction module 106. The data processing arrangement 102 is operable to host the tabular data detection module 104 and the tabular data extraction module 106 therein. Optionally, the system 100 comprises a database arrangement 108, wherein the database arrangement 108 is communicatively coupled to the data processing arrangement 102.

Referring to FIGS. 2A-H there are shown exemplary tabular data associated with operation the system 100 of FIG. 1, in accordance with an embodiment of the present disclosure.

FIG. 2A depicts an image 200 of the tabular data extracted from an electronic document by the tabular data detection module 104 of the data processing arrangement 102.

FIG. 2B depicts a greyscale image 300 of the tabular data that is obtained by converting the extracted image 200 of the tabular data into the greyscale image 300 by the tabular data extraction module 106 of the data processing arrangement 102.

FIG. 2C depicts a pixel array 400 of pixels corresponding to vertical lines of a grid structure of the tabular data extracted from the greyscale image 300 by the tabular data extraction module 106 of the data processing arrangement 102.

FIG. 2D depicts a pixel array 500 of pixels corresponding to horizontal lines of the grid structure of the tabular data extracted from the greyscale image 300 by the tabular data extraction module 106 of the data processing arrangement 102.

FIG. 2E depicts a pixel array 600 of pixels of the grid structure obtained by combining the pixel array 400 and the pixel array 500 by the tabular data extraction module 106 of the data processing arrangement 102.

FIG. 2F depicts a greyscale image without grid structure 700 of the tabular data that is obtained by removing the pixel array 600 from the greyscale image 300 by the tabular data extraction module 106 of the data processing arrangement 102.

FIG. 2G depicts a greyscale image without the grid structure 800 wherein text within the tabular data has been subjected to morphological dilation by the tabular data extraction module 106 of the data processing arrangement 102.

FIG. 2H depicts a tabular data 900 generated by the tabular data extraction module 106 of the data processing arrangement 102, by combining information of the grid structure of the tabular data extracted from the pixel array 600 and information of text associated with the tabular data obtained by performing optical character recognition of text from the extracted image 200.

Referring to FIGS. 3A-B, there are shown steps of a method 300 for extracting a tabular data from an electronic document, in accordance with an embodiment of the present disclosure. At a step 302, the electronic document is received. At a step 304, a location of the tabular data is determined within the electronic document. At a step 306, an image of the tabular data is extracted from the electronic document. At a step 308, the extracted image of the tabular data is converted into a greyscale image of the tabular data. At a step 310, a grid structure of the tabular data is extracted from the greyscale image. At a step 312, the grid structure of the tabular data is removed from the greyscale image, by superimposing the grid structure on to the greyscale image. At step 314, a position for placement of horizontal and vertical lines is determined in the greyscale image without the grid structure. At a step 316, horizontal lines and vertical lines are generated on the greyscale image without the grid structure, to obtain information of grid structure of the tabular data. At a step 318, optical character recognition is performed of the text associated with the tabular data from the extracted image, to obtain information of text associated with the tabular data. At a step 320, the tabular data is extracted by combining the information of the grid structure of the tabular data with the text associated with the tabular data, to generate the tabular data.

The steps 302 to 320 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for extracting tabular data from an electronic document, the system having a data processing arrangement that is to:
   (i) receive the electronic document;
   (ii) determine a location of the tabular data within the electronic document;
   (iii) extract an image of the tabular data from the electronic document;
   (iv) convert the received image of the tabular data into a greyscale image of the tabular data;
   (v) extract a grid structure of the tabular data from the greyscale image;
   (vi) remove the grid structure of the tabular data from the greyscale image, by superimposing the extracted grid structure on to the greyscale image;
   (vii) determine a position for placement of horizontal and vertical lines in the greyscale image without the grid structure;
   (viii) generate horizontal and vertical lines on the greyscale image without the grid structure, to obtain information of grid structure of the tabular data;

(ix) perform optical character recognition of the text associated with the tabular data from the received image, to obtain information of text associated with the tabular data; and (x) extract the tabular data by combining the information of the grid structure of the tabular data with the text associated with the tabular data, to generate the tabular data.

2. The system of claim 1, further comprising a database communicatively coupled to the data processing arrangement, wherein the database is configured to store the electronic document and/or the generated tabular data.

3. The system of claim 1, wherein the data processing arrangement employs deep-learning.

4. The system of claim 3, wherein the data processing arrangement is configured to determine the location of the tabular data within the electronic document, based on a confidence score associated with detection of the tabular data within the electronic document being higher than a predefined threshold score.

5. The system of claim 1, wherein the data processing arrangement is configured to extract the image of the tabular data by generating a bounding box around the tabular data within the electronic document.

6. The system of claim 1, wherein the data processing arrangement is further configured to perform thresholding of the greyscale image subsequent to converting the received image into the greyscale image, wherein the thresholding of the greyscale image is performed by employing adaptive Gaussian technique.

7. The system of claim 6, wherein the data processing arrangement is further configured to perform bilateral filtering of the greyscale image, subsequent to performing the thresholding of the greyscale image.

8. The system of claim 1, wherein the data processing arrangement is configured to extract the grid structure from the greyscale image by performing morphological dilation and morphological erosion.

9. The system of claim 8, wherein the data processing arrangement is configured to perform the morphological dilation and the morphological erosion by using a structural element having a specific size, and wherein the size of the structural element is determined based on a page size of the electronic document.

10. The system of claim 1, wherein the data processing arrangement is further configured to remove the grid structure of the tabular data from the received image, by superimposing the grid structure extracted from the greyscale image on to the received image.

11. The system of claim 10, wherein the data processing arrangement is further configured to remove salt and pepper noise from the greyscale image without the grid structure and/or the received image without the grid structure subsequent to removing the grid structure therefrom, and wherein the salt and pepper noise is removed using median filtering.

12. The system of claim 1, wherein the data processing arrangement is configured to determine the position for placement of horizontal and vertical lines in the greyscale image without the grid structure, by using a sliding window to perform a bitwise ANDing operation of each pixel of the greyscale image without the grid structure and an array of ones, and wherein an output of the bitwise ANDing operation is a pixel array.

13. The system of claim 12, wherein the data processing arrangement is further configured to perform morphological dilation on the greyscale image without the grid structure prior to performing the bitwise ANDing operation.

14. The system of claim 1, wherein the data processing arrangement is further configured to determine an ideal position for placement of each horizontal and vertical line in the greyscale image without the grid structure, by filtering redundant positions from all possible positions for placement of horizontal and vertical lines in the greyscale image without the grid structure.

15. The system of claim 1, wherein the data processing arrangement is configured to generate the horizontal lines and vertical lines on the greyscale image without the grid structure by:
generating, by rotating orthogonally the greyscale image without the grid structure, horizontal lines on the greyscale image without the grid structure; and
generating vertical lines on the greyscale image without the grid structure.

16. The system of claim 1, wherein the data processing arrangement is further configured to generate the tabular data as a comma separated values (CSV) file.

17. A method for extracting tabular data from an electronic document, the method comprising:
(i) receiving the electronic document;
(ii) determining a location of the tabular data within the electronic document;
(iii) extracting an image of the tabular data from the electronic document;
(iv) converting the extracted image of the tabular data into a greyscale image of the tabular data;
(v) extracting a grid structure of the tabular data from the greyscale image;
(vi) removing the grid structure of the tabular data from the greyscale image, by superimposing the grid structure on to the greyscale image;
(vii) determining a position for placement of horizontal and vertical lines in the greyscale image without the grid structure;
(viii) generating horizontal lines and vertical lines on the greyscale image without the grid structure, to obtain information of grid structure of the tabular data;
(ix) performing optical character recognition of the text associated with the tabular data from the extracted image, to obtain information of text associated with the tabular data; and
(x) extracting the tabular data by combining the information of the grid structure of the tabular data with the text associated with the tabular data, to generate the tabular data.

18. A software product recorded on machine-readable non-transient data storage media, wherein the software product is executable upon computing hardware to implement the method of claim 17.

* * * * *